(12) United States Patent
Deutscher et al.

(10) Patent No.: US 6,766,425 B2
(45) Date of Patent: Jul. 20, 2004

(54) CALIBRATION METHOD IMPLEMENTING SEGMENTED FLASH MEMORY AND RAM OVERLAY

(75) Inventors: Dale W. Deutscher, Kokomo, IN (US); Mary T. Hedges, Greentown, IN (US); Charles M. Grimm, Carmel, IN (US); Roy M. Fildes, Westfield, IN (US); Kevin M. Gertiser, Noblesville, IN (US); W. James Allen, Carmel, IN (US); Ben F Mc Cormick, II, Fishers, IN (US); Larry D. Burkholder, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 203 days.

(21) Appl. No.: 10/146,776

(22) Filed: May 16, 2002

(65) Prior Publication Data

US 2003/0217222 A1 Nov. 20, 2003

(51) Int. Cl.⁷ .............................................. G06F 12/00
(52) U.S. Cl. ........................ 711/152; 711/163; 711/103; 701/1
(58) Field of Search ........................ 711/103, 152–153, 711/163, 170, 173; 701/1, 35; 713/1; 365/45; 463/45

(56) References Cited

U.S. PATENT DOCUMENTS

| | | | | |
|---|---|---|---|---|
| 5,394,327 A | * | 2/1995 | Simon et al. .................. 701/1 |
| 5,600,818 A | * | 2/1997 | Weikmann .................. 711/163 |
| 5,624,316 A | * | 4/1997 | Roskowski et al. ........... 463/45 |
| 6,101,600 A | * | 8/2000 | Arnold et al. ................. 713/1 |
| 6,263,412 B1 | * | 7/2001 | Townsend .................. 711/170 |
| 6,308,121 B1 | * | 10/2001 | Ulm .......................... 701/35 |
| 6,505,105 B2 | | 1/2003 | Allen et al. .................. 701/33 |
| 6,525,952 B2 | * | 2/2003 | Araki et al. ................. 365/45 |
| 6,591,209 B1 | | 7/2003 | Romano et al. ............. 702/96 |

* cited by examiner

Primary Examiner—Nasser Moazzami
(74) Attorney, Agent, or Firm—Jimmy L. Funke; Stefan V. Chmielewski

(57) ABSTRACT

A method for computer memory calibration includes flashing a calibration from a processor into two flash memory sections. Either the same or an alternate processor requests data stored in one of the flash memory sections. Subsequently, exception handler logic within an exception mechanism activates and generates an exception for the data stored in the aforementioned flash memory section. The calibration in the other flash memory section then transfers to the processor through the functioning of the exception.

21 Claims, 2 Drawing Sheets

CALIBRATION METHOD IMPLEMENTING SEGMENTED FLASH MEMORY AND RAM OVERLAY

TECHNICAL FIELD

The present invention relates generally to computer memory calibration, and more particularly to computer memory calibration using flash and memory protection mechanisms.

BACKGROUND ART

Microprocessor-based computer systems are well known and widely available. Generally, the core of a microprocessor system is a single integrated circuit (IC) chip, which contains a processor. Typically, after conducting a bootstrap initialization process, the processor reads, decodes and executes a stream of instructions, which form a program or process. Usually, the process is stored in random access memory (RAM) or read only memory (ROM), which is external to the processor chip.

RAM is the most common type of memory found in computers and other related devices. RAM is volatile, meaning RAM contents are lost when power is turned off. RAM is generally synonymous with main memory or the memory available to programs. For example, a computer with an 8M RAM has approximately eight million bytes of memory that programs can use. In contrast, ROM refers to special memory used to store programs that boot the computer and perform diagnostics. Once data has been written onto a ROM chip, it generally cannot be modified, but can only be read. Most personal computers have a small amount of ROM (a few thousand bytes). Both types of memory (ROM and RAM) allow random access.

Electrically erasable programmable read-only memory (EEPROM) is a type of ROM that is erasable (one byte at a time) by exposure to electrical charge. As with other types of ROM, EEPROM retains its contents when power is turned off and is not as fast as RAM.

Flash memory is a special type of EEPROM that is erased and reprogrammed in blocks. Many modern Personal computers (PCs) have Basic Input/Output Systems (BIOS) stored on flash memory chips to simplify system updates. Standard flash memory often contains separate blocks, which can be programmed individually. However, if one block is being erased, none of the blocks can be accessed until the erase procedure is complete. Segmented flash are available which contain two or more blocks or segments which can be accessed even when another segment is being reprogrammed.

Emulation is the ability of a program or device to imitate another program or device. Emulation tricks the software into believing that a device is really a different device. Emulators add value to corresponding computer systems by facilitating testing of computer components on printed circuit boards (e.g., baseboards or computer cards), and by facilitating modification of software in ROM based systems without requiring ROM re-program for every software modification.

By breaking the connection between a target memory and the local processor, an emulator can allow either the target memory to provide the necessary data or the emulator to provide data instructions and addresses for the local processor to execute. Emulator overlay memory allows the emulator to provide data to the processor, regardless of the actual data included in the target memory.

Currently, calibration development has been conducted through hardware devices. An example of an existing technique is the external system-to-control-unit ROM emulation device. This design requires controllers with robust test connectors that give access to the micro-controller bus. A test connector, however, requires a large area of control unit substrate and an emulation device, both of which are costly.

An alternate calibration technique is an internal-to-control-unit full calibration emulator. This technique requires a controller having an additional emulation RAM, which is relatively expensive and which substantially burdens control unit substrate and microprocessor chip selection resources.

Another current calibration technique is the use of internal microprocessor overlay RAM (also referred to as tuning RAM or CALRAM). This technique requires additional RAM with supporting logic to overlay a flash area, but this may add cost to the production configuration and is limited by the size of RAM available.

Other implementations of calibration development are possible by modifying the algorithm software itself. This invention allows a de-coupling of the algorithm from the calibration data access implementation.

The disadvantages associated with current computer memory calibration techniques have made it apparent that a new technique to regulate computer memory calibration using only resources available in production (i.e. flash memory and memory protection mechanism) is needed. The new technique should facilitate calibration over a serial, parallel or debug port and should also minimize the quantity of required hardware components and thereby substantially minimize system costs. The present invention is directed to these ends.

SUMMARY OF THE INVENTION

The present invention provides a method for computer memory calibration. The present invention also provides a system for implementing the computer memory calibration method.

In accordance with the present invention, a method for computer memory calibration, which includes the step of flashing a calibration into a first flash memory section and a second flash memory section, is disclosed. A central processing unit (CPU) requests data stored in the first flash memory section. Exception handler logic within a memory protection mechanism activates and generates an exception for the data stored in the first flash memory section. The calibration in the second flash memory section is then transferred to the CPU as a function of the exception.

One advantage of the present invention is that it reduces costs associated with part count. Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a calibration method which implements segmented flash and memory protection exception mechanism, particularly suited to the automotive field. The present invention is, however, applicable to various other uses that may require computer memory calibration methods, as will be understood by one skilled in the art.

Figure 1:
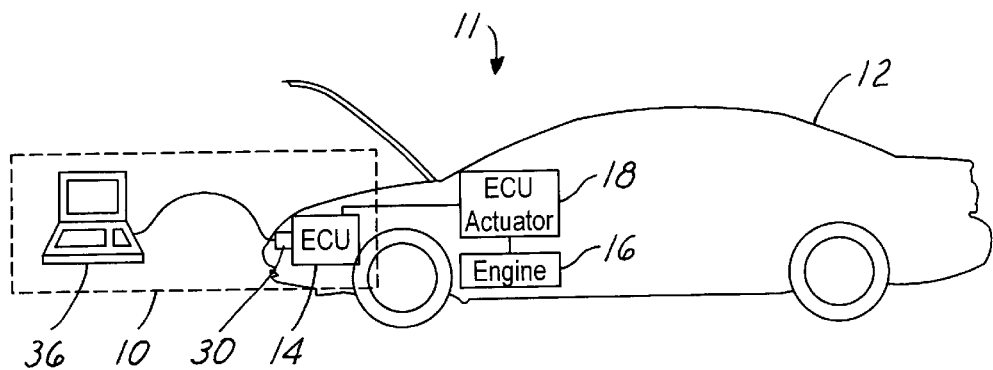
FIG. 1 is a vehicle containing a computer memory calibration system in accordance with an embodiment of the present invention.
Figure 2:
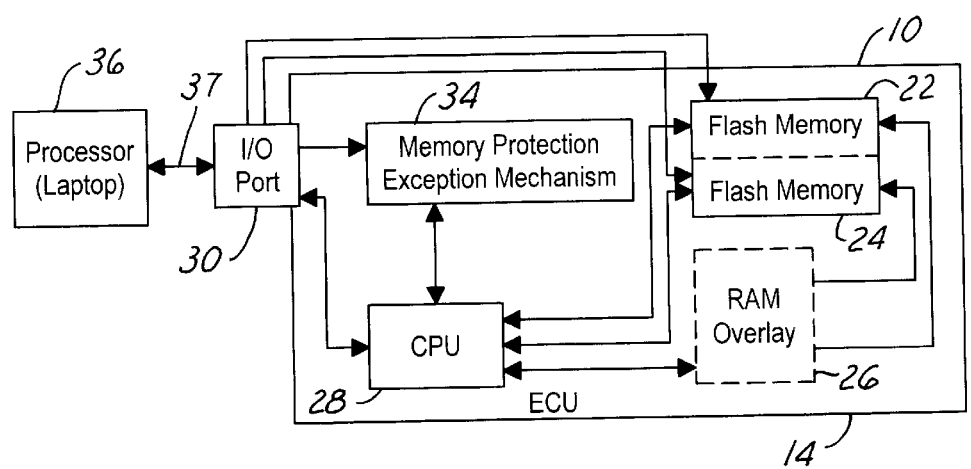
FIG. 2 is a computer memory calibration system in accordance with an embodiment of the present invention.

Referring to FIGS. 1 and 2, a computer memory calibration system 10 incorporated in a vehicle system 11, in accordance with an embodiment of the present invention, is illustrated. FIG. 1 demonstrates a vehicle 12 containing an Engine Control Unit (ECU) 14 coupled to the engine 16 through the ECU actuator 18. However, one skilled in the art will understand that the method applied in the system 10 is applicable to numerous alternate control devices requiring calibration. In accordance with the current invention, software, such as Delphi Personal Computer Calibration Development System Software, which controlled the traditional external ROM emulation or parallel bus-in-vehicle calibration development tools, has been modified to function with chips containing built in memory protection, as will be discussed later. In addition to engine control units, the system 10 also functions well with numerous alternate production controllers, as will be understood by one skilled in the art.

The Engine Control Unit (ECU) 14 includes a first flash memory section 22, a second flash memory section 24, CPU 28 (second central processing unit), a memory protection and exception mechanism 34, and a random access memory (RAM) 26, the preferred embodiment being RAM with overlay capability. The memory (RAM) overlay 26 is connected to both flash memory sections 22, 24. The flash memory sections 22, 24 are typically incorporated in a separate IC or the same IC as the CPU 28. It should be noted that although flash memory sections 22, 24 are illustrated as a segmented flash, other embodiments are possible. Segmented flash containing segments with independent read/write capability are utilized in the preferred embodiment of this invention.

The CPU 28 is embodied as a component of the ECU 14, and is electrically connected to the memory (RAM) overlay 26 and the ECU input/output port (I/O) 30. A processor or first CPU (here embodied as a laptop computer 36 external to the ECU) is electrically connected to the ECU 14 through the ECU I/O port 30. The flash memory sections 22, 24 may also connect directly to the ECU I/O port 30.

The Engine Control Unit 14 uses closed-loop control to manage, for example, engine functions such as, the emissions and fuel economy of the engine 16. The embodied ECU 14 contains CPU 28, the flash memories 22, 24, the exception mechanism 34, and the I/O port 30. It is to be understood that the ECU components are alternately embodied as contained within a single integrated circuit chip or multiple combinations of integrated circuits. The ECU 14 is embodied as an integrated circuit (or a group of integrated circuits) that contains the exception mechanism 34, which transfers flash memory data from the second flash memory section 24 to the CPU 28, as will be discussed later.

Microcontrollers are highly integrated chips that typically contain CPUs, RAM, some form of ROM, I/O ports, and timers. Unlike general-purpose computers, which also include these components, microcontrollers are designed for very specific tasks, e.g., to control particular systems. One embodiment of a microcontroller that can support this implementation is a MPC565 microcontroller designed by Motorola. This type of chip is suitable for the system 10 because it has built in memory protection and therefore does not require supplemental chips, as will be understood by one skilled in the art.

The flash memory (calibration) sections 22, 24 receive input from the processor 36 via the I/O port 30 if the I/O port is implemented as a debug port. With this implementation, processor 36 is able to modify the flash memory sections 22, 24.

The CPU 28 is also electrically connected to the memory overlay 26, the memory protection exception mechanism 34 and the ECU I/O port 30. If the I/O port is implemented as a serial port, the processor 36 is able to modify the flash memory sections through the serial or parallel port, via the CPU. When calibration development is required for the vehicle 12, instructions are given to the CPU 28, through the I/O port 30, to flash the same memory into both the flash memory sections 22, 24.

A processor (here embodied as a laptop computer 36) electrically connects to the ECU 14 through the I/O port 30. Typically, this connection is made through a serial bus 37, as will be understood by one skilled in the art. One implementation of the serial bus 37 is Controller Area Network (CAN) using CAN Calibration Protocol (CCP). The laptop 36 controls the CPU 28 through logic contained in the laptop 36 and input from a manufacturer or a diagnostic technician.

When calibration development is required for the vehicle 12, processor 36 gives instructions to the CPU 28, through the I/O port 30, to flash the same data into both flash memory sections 22, 24. In one embodiment, temporary calibration values are entered into the RAM overlay and the RAM is configured to re-map accesses from flash memory 22 to the RAM overlay. Once the calibration data is mature, the data in the RAM overlay is flashed into the memory section 22. To allow access to other data within memory section 22 while the new data is being modified, laptop 36 makes requests to the memory protection exception mechanism 34 to block access from the CPU 28 to the first flash memory section 22 and instead to deliver data from the second flash memory section 24. Access to the first flash memory section 22 is blocked when the first flash memory section 22 is undergoing modification because access to the first flash memory section 22 when it is undergoing modification will return incorrect data.

In a system without a RAM overlay function, the present invention is still utilized. Instead of entering temporary calibration data into the RAM overlay, the data is directly flashed into memory section 22 and the memory protection exception mechanism used to protect further accesses to the memory segment.

Memory accesses to the flash memory 22 are blocked by the exception mechanism 34. The exception mechanism 34 contains logic operative to copy the CPU 28 request for data from the first flash memory section 22 to internal RAM, modify the request to use data from the second flash memory section 24, and copy the data to CPU 28 registers. The logic in the exception mechanism is a modification of software, such as Delphi Personal Computer Calibration Development System Software, as will be understood by one skilled in the art. Typically, exception mechanisms are designed to detect failures and error conditions that require shutdown or error recovery routines, the present invention adapts the exception handler to act as a monitoring device to detect requests for data from flash memory sections undergoing calibration and to redirect or modify those requests.

In an alternative embodiment, the calibrator or technician requests via laptop 36 to run the vehicle 12 with data from the second flash memory 24. Instead of changing the algorithm software to explicitly use the data in flash memory 24, the present invention is applied. To accomplish this request, operatives are passed via I/O port 30 to the memory protection exception mechanism 34 to substantially prevent access to the first flash memory section 22. Once configured, the CPU 28 communicates to the flash memory sections 22, 24. This communication is monitored by the memory protection exception mechanism 34. The exception mechanism 34 prevents access to the first memory section 22 through internal exception handler logic. An exception signal is generated in response to the CPU 28 request and data from the second flash memory section is transferred to the CPU. In other words, the laptop 36 is controlling the exception mechanism 34 such that the CPU 28 will see one of the two alternate sets of data.

Figure 3:
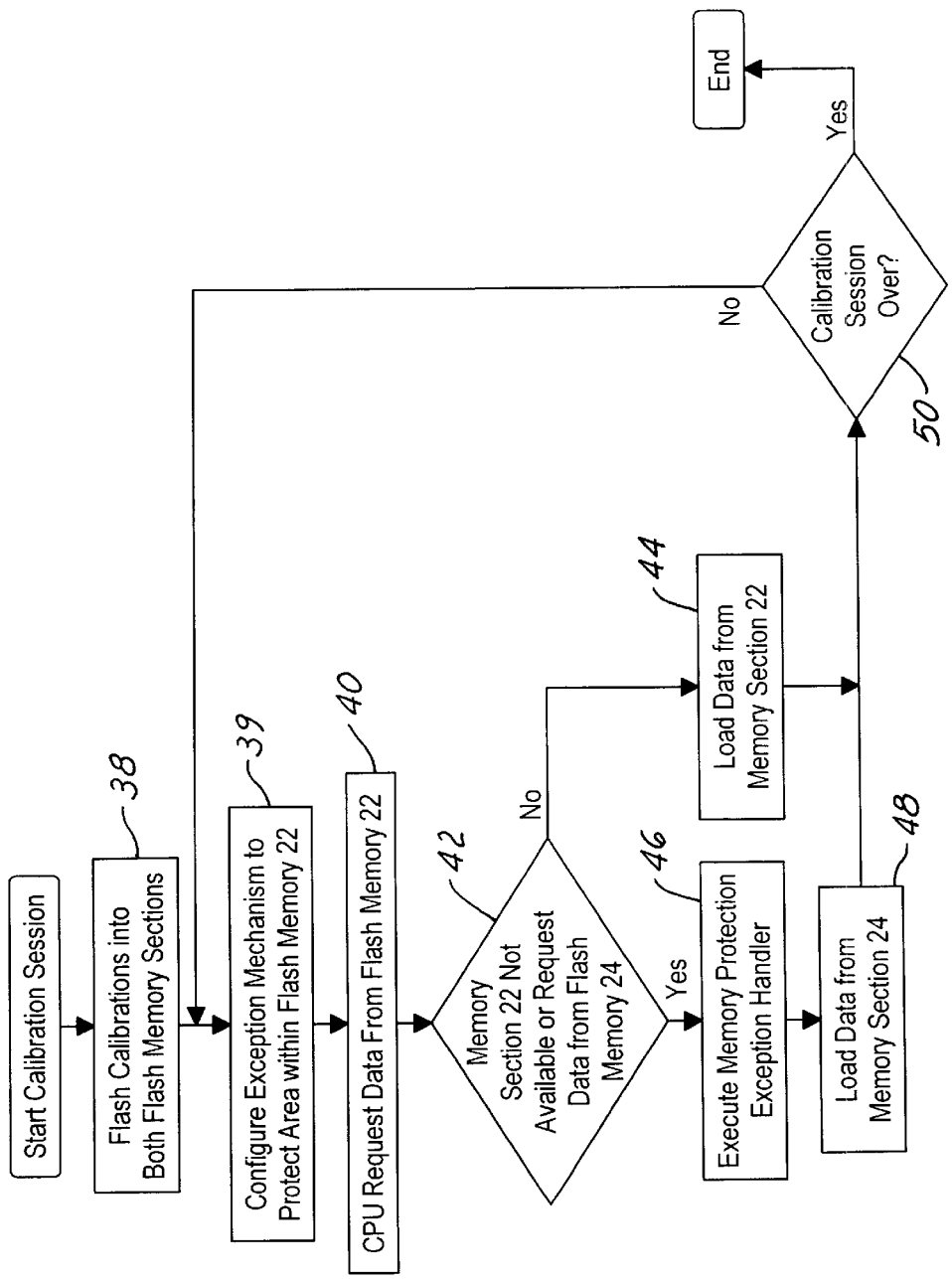
FIG. 3 is a block diagram of a computer memory calibration method in accordance with an embodiment of the present invention.

Referring to FIG. 3, a block diagram of a calibration method, which implements segmented flash and memory protection exception mechanism, in accordance with an embodiment of the present invention, is illustrated. Logic starts in operation block 38 where calibration data is flashed from laptop 36 into both the first and the second flash memory sections, as will be understood by one skilled in the art. The laptop 36 receives the calibration data typically from either a pre-set calibration state or from input by a technician on the laptop.

Operation block 39 then configures the memory protection mechanism to generate an exception when data within the selected range is accessed. Operation block 40 activates when a request is made from the central processing unit for data from the first flash memory section. Important to note is that the aforementioned request may be made to either flash memory section, however to illustrate the operations of the embodied invention, only the first flash memory section is mentioned. A check is then made in inquiry block 42, by the exception mechanism, whether the first flash memory is blocked by the laptop or in second embodiment, if the calibrator requested to run with data from the second flash memory section 24. For a negative response (i.e. no exception is detected), the processor sends first flash memory data to the requesting processor in block 44.

Otherwise, when an exception is detected, operation block 46 is implemented, and the exception mechanism substantially prevents access to the data contained in the first flash memory section. The exception mechanism determines which calibration is accessed and which instruction is used. It then either transfers the data from the second flash memory section to the requesting CPU or, in an alternate embodiment, modifies the CPU request to use the second flash memory data. Operation block 48 then activates, and the exception handler software, within the exception mechanism, loads the second flash memory section data to the requesting CPU. A check is then made in inquiry block 50 as to whether the calibration session is over. For a positive response, the control logic ends. Otherwise, operation block 39 reactivates.

In operation, the method for computer memory calibration begins by flashing a calibration from a CPU into at least two flash memory sections contained in either the same CPU or a different processor. When a subsequent modification of one of the flash memory sections occurs from instructions given by the processor, the exception mechanism is engaged to prevent access to that flash memory section and to direct requests from the CPU to the other memory section. This step is typically accomplished through the exception mechanism generating an exception to access of a calibration undergoing modification. The exception mechanism then transfers the calibration in the second flash memory section to the CPU or modifies the request for first flash memory section data to request the calibration within the second flash memory section.

From the foregoing, it can be seen that there has been brought to the art a new calibration method, which implements segmented flash and memory protection mechanism. It is to be understood that the preceding descriptions of various embodiments are merely illustrative of some of the many specific embodiments that represent applications of the principles of the present invention. Numerous and other arrangements would be evident to those skilled in the art without departing from the scope of the invention as defined by the following claims.

What is claimed is:

1. A computer calibration system, comprising:
a first memory section;
a second memory section;
an exception mechanism adapted to receive a request from a first central processing unit for first memory data from said first memory section, said exception mechanism containing logic operative to substantially prevent access to said first memory section, said exception mechanism further adapted to generate an exception signal as a function of said request, said exception mechanism adapted to transfer memory data from said second memory section as a function of said exception signal; and
an Engine Control Unit coupled to at least one of said first and second memory sections, said Engine Control Unit adapted to manage engine functions based on calibration values in one of said first and second memory sections.

2. The system of claim 1, wherein said Engine Control Unit includes an I/O port adapted for connection with a computing device capable of performing diagnostics.

3. The system of claim 1, wherein said Engine Control Unit includes an I/O port adapted for connection with a computing device, said Engine Control Unit being capable of storing new calibration data received from said I/O port.

4. A computer calibration system, comprising:
a first memory section;
a second memory section;
an exception mechanism adapted to receive a request from a first central processing unit for first memory data from said first memory section, said exception mechanism containing logic operative to substantially prevent access to said first memory section, said exception mechanism further adapted to generate an exception signal as a function of said request, said exception mechanism adapted to transfer memory data from said second memory section as a function of said exception signal;
a memory overlay, said memory overlay adapted to hold changes for said first and second memory sections; and
a second central processing unit containing logic adapted to control said memory overlay to hold changed for said first memory section.

5. The system of claim 4 wherein said memory overlay comprises a RAM overlay.

6. The system of claim 4 wherein said second central processing unit comprises a microcontroller containing said first and second flash memory sections and said memory overlay.

7. The system of claim 6 wherein said microcontroller has internal memory protection.

8. The system of claim 6 wherein said first central processing unit comprises a laptop.

9. The system of claim 6 wherein said first central processing unit comprises an external computing device.

10. The system of claim 4 wherein said first memory section comprises flash memory.

11. The system of claim 4 wherein said second memory section comprises flash memory.

12. The system of claim 4, further comprising a number of memory sections greater than two.

13. The system of claim 12 wherein flash memories comprise said number of memory sections greater than two.

14. A method for computer memory calibration, comprising:

flashing a calibration into a first flash memory section and a second flash memory section;

requesting that data stored in said first flash memory section transfer to a central processing unit;

activating exception handler logic within an exception mechanism;

generating an exception, through said exception handler logic; for said data stored in said first flash memory section; and transferring said calibration in said second flash memory section to said central processing unit as a function of said exception.

15. The method of claim 14 further comprising operating a memory overlay to modify said first flash memory section.

16. The method of claim 14 further comprising operating a memory resource to modify said first flash memory section.

17. The method of claim 14 wherein requesting further comprises requesting that data stored in said first flash memory section transfer to said central processing unit.

18. The method of claim 14 wherein flashing further comprises flashing a calibration into a plurality of flash memory sections.

19. A method for computer memory calibration, comprising:

flashing data from a processor into a first flash memory section and a second flash memory section;

sending a signal from said processor to modify said second flash memory section;

requesting that data stored in said first flash memory section transfer to a central processing unit;

activating exception handler logic within an exception mechanism;

generating an exception, through said exception handler logic, for said data stored in said first flash memory section; and transferring said data in said second flash memory section to said central processing unit as a function of said exception.

20. The method of claim 19, wherein requesting further comprising requesting that data stored in said first flash memory section transfer to said central processing unit while said first flash memory is undergoing modification.

21. The method of claim 19 wherein flashing further comprises flashing data into a plurality of flash memory sections.

* * * * *